Patented June 2, 1925.

1,540,117

UNITED STATES PATENT OFFICE.

GUSTAV GIEMSA, OF HAMBURG, GERMANY, ASSIGNOR TO C. F. BOEHRINGER & SOEHNE G. M. B. H., OF MANNHEIM-WALDHOF, GERMANY.

MANUFACTURE OF BISMUTH TARTRATES.

No Drawing.  Application filed September 9, 1924.  Serial No. 736,791.

*To all whom it may concern:*

Be it known that I, GUSTAV GIEMSA, citizen of Germany, residing at Hamburg, Germany, have invented certain new and useful Improvements in the Manufacture of Bismuth Tartrates; and I do hereby declare the following to be a full, clear, and exact description of the invention, such as will enable others skilled in the art to which it appertains to make and use the same.

The present invention relates to the art of obtaining bismuth-tartrates, and it is specifically directed to the preparation of the sodium salts.

Hitherto the efforts to obtain sodium-salts of bismuth-tartaric acid in a pure condition and solid form have not been successful, as has been the case with certain complex potassium bismuth-tartrates. See in this respect Zeitschrift für anorganische Chemie, vol. 48 (1906), page 212, and Archiv der Pharmazie, vol. 246 (1908), page 501.

I have found that a new compound, which is a tribismuthyl-tartrate of sodium, can be produced by reacting on di-sodium-tartrate with bismuth-hydroxid in excess. The new compound obtained in this manner is distinguished by extraordinarily great solubility and by a very high content in bismuth (71.14%), which properties adapt it particularly to therapeutic applications, in particular for purposes of injection.

The following example illustrates my preferred manner of carrying out my invention:

Pure bismuth-hydroxid is added in excess to a molar solution of di-sodium tartrate and the whole is heated for two hours on the water-bath. A bismuth hydroxid proper for this reaction may be prepared by the process described by Vanino and Zumbusch in "Archiv der Pharmazie," vol. 248 (1010), page 665. Under this treatment on the water-bath two moles of bismuth-hydroxid will go into solution for each five moles of di-sodium tartrate. After the mass of the reaction has cooled off, it is mixed with an equal volume of alcohol of fifty per cent strength. This treatment causes a very fine crystalline precipitate to be thrown down, which precipitate is drained on a suction filter, the residue on the filter being washed several times with 50% alcohol. By this precaution I prevent a concurrent precipitation of sodium tartrate with the new body. The residue is then dried and the new product thus obtained constitutes a white coherent micro-crystalline mass which is readily soluble in water with alkaline reaction. The new product is insoluble in organic solvents. Its structure is represented by the formula:

COONa.CHO.BiO.CHO.BiO.COO.BiO.

According to the mode of procedure it crystallizes with two or four molecules of water of crystallization.

What I claim and desire to secure by Letters Patent is:

1. The process of preparing a sodium salt of bismuth-tartaric acid, which consists in reacting on di-sodium-tartrate with bismuth-hydroxid.

2. The process of preparing a sodium salt of bismuth-tartaric acid, which consists in reacting on di-sodium-tartrate with bismuth-hydroxid in aqueous solution.

3. The process of preparing a sodium salt of bismuth-tartaric acid, which consists in reacting on a molar aqueous solution of di-sodium-tartrate with bismuth-hydroxid in excess.

4. The process of preparing a sodium salt of bismuth-tartaric acid, which consists in heating a solution of di-sodium-tartrate with bismuth-hydroxid in excess.

5. The process of preparing a sodium salt of bismuth-tartaric acid, which consists in heating a solution of di-sodium-tartrate with bismuth-hydroxid in excess, adding diluted alcohol to the cooled mass of reaction, then filtering the resultant mass and washing the residue with diluted alcohol.

6. The process of preparing a sodium salt of bismuth-tartaric acid, which consists in heating a solution of di-sodium-tartrate with bismuth-hydroxid in excess, adding alcohol of fifty per cent strength to the cooled mass of reaction, then filtering the resultant mass and washing the residue with alcohol of the same strength.

7. As a new product, a sodium-bismuth-tartrate comprising sodium as the only constituent alkali-metal, which is readily soluble in water and insoluble in organic solvents.

8. As a new product, sodium tribismuthyl-tartrate which is readily soluble in water with alkaline reaction, not soluble in organic solvents, and whose constitution correspond to the formula:

COONa.CHO.BiO.CHO.BiO.COO.BiO.

In testimony whereof I hereunto affix my signature in the presence of two witnesses.

GUSTAV GIEMSA.

Witnesses:
 E. KASPAUH,
 EDITH WISE.